US012630047B2

(12) United States Patent
Wang

(10) Patent No.: US 12,630,047 B2
(45) Date of Patent: May 19, 2026

(54) POWER SUPPLY SYSTEM FOR ELECTRIC VEHICLES

(71) Applicant: Yongxin Wang, San Ramon, CA (US)

(72) Inventor: Yongxin Wang, San Ramon, CA (US)

( * ) Notice: Subject to any disclaimer, the term of this patent is extended or adjusted under 35 U.S.C. 154(b) by 522 days.

(21) Appl. No.: 18/339,814

(22) Filed: Jun. 22, 2023

(65) Prior Publication Data

US 2023/0331116 A1     Oct. 19, 2023

Related U.S. Application Data

(62) Division of application No. 17/169,416, filed on Feb. 6, 2021, now Pat. No. 11,718,198.

(Continued)

(51) Int. Cl.
B60L 53/80 (2019.01)
B60L 50/60 (2019.01)
(Continued)

(52) U.S. Cl.
CPC ............... B60L 53/80 (2019.02); B60L 50/66 (2019.02); B60L 58/10 (2019.02); H01M 10/425 (2013.01); H01M 50/244 (2021.01); H01M 50/249 (2021.01); *H01M 2010/4271* (2013.01); *H01M 2010/4278* (2013.01); *H01M 2220/20* (2013.01)

(58) Field of Classification Search
CPC ............. H01M 50/248; H01M 50/244; H01M 10/425; H01M 2010/4271; H01M 2010/4278; H01M 2220/20; B60L 53/80; B60L 50/66; B60L 58/10
USPC .......................................................... 429/10
See application file for complete search history.

(56) References Cited

U.S. PATENT DOCUMENTS

2011/0204845 A1     8/2011   Paparo et al.
2013/0300204 A1    11/2013   Partovi
(Continued)

FOREIGN PATENT DOCUMENTS

KR     10-2017-0110885 A     10/2017
KR         10-1883799 B1      7/2018

OTHER PUBLICATIONS

International Search Report in the related PCT application No. PCT/US2021/017079, dated Jun. 2, 2021.
(Continued)

*Primary Examiner* — James M Erwin
(74) *Attorney, Agent, or Firm* — Chen Yoshimura LLP

(57)     ABSTRACT

An in-vehicle power supply system includes multiple power cells of identical mechanical size, multiple power pods each holding multiple power cells, and a mechanical transport system to move and exchange power cells with pumps at power cell exchange and charging stations. Each power cell and each power pod includes a control unit and a power converter with a magnetic core. The power cells held by a power pod are arranged parallel to each other and coupled to the power pod by magnetic field coupling. Power is transferred between the power pod and the power cells bidirectionally using magnetic field of different frequencies, and data and commands are communicated between them using magnetic field of another different frequency. Load balancing among power cells within a power pod and among power pods can be achieved. The structure of the power cell exchange and charging stations is also described.

6 Claims, 8 Drawing Sheets

Power cell 12

Battery container 122

Battery cells 123

Battery cell disable agent 124

Power cell-side conversion and control unit 121

Power converter 125

Magnetic core 127

Control unit 126

Related U.S. Application Data

(60)  Provisional application No. 62/971,976, filed on Feb. 8, 2020.

(51)  Int. Cl.
| | |
|---|---|
| *B60L 58/10* | (2019.01) |
| *H01M 10/42* | (2006.01) |
| *H01M 50/244* | (2021.01) |
| *H01M 50/249* | (2021.01) |

(56)  References Cited

U.S. PATENT DOCUMENTS

| | | | |
|---|---|---|---|
| 2019/0375306 A1* | 12/2019 | Ambrosetti | B60L 53/30 |
| 2020/0036196 A1 | 1/2020 | Fasano et al. | |
| 2021/0009089 A1* | 1/2021 | Zhang | B60L 53/80 |

OTHER PUBLICATIONS

Written Opinion in the related PCT application No. PCT/US2021/017079, dated Jun. 2, 2021.

* cited by examiner

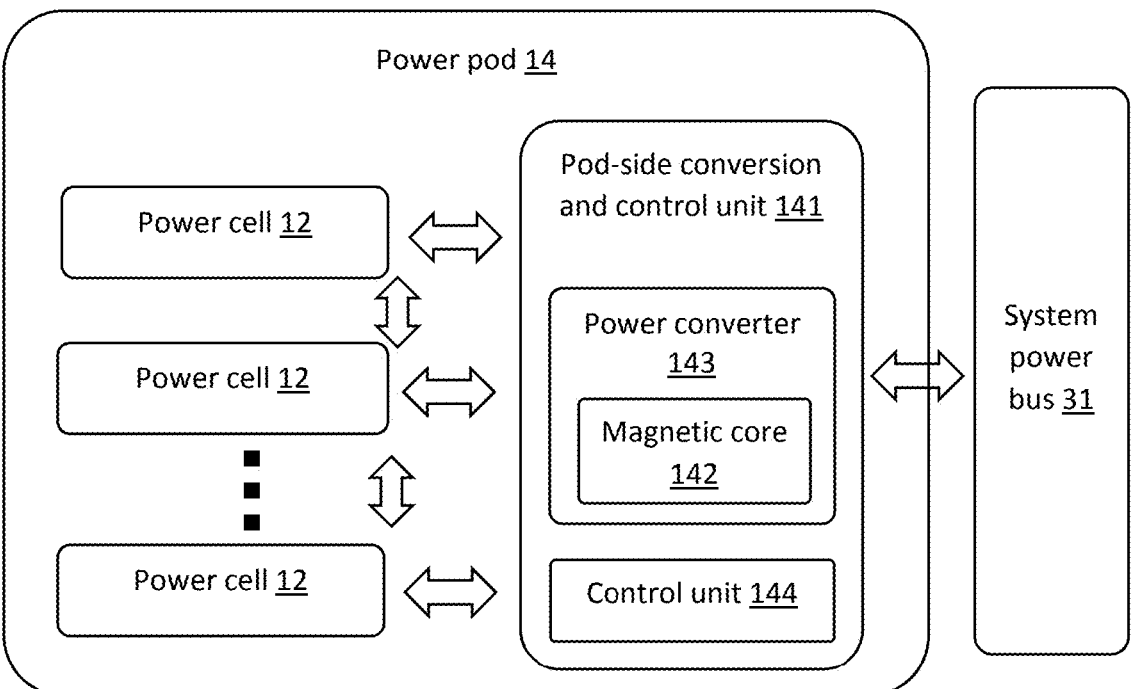
Figure 6
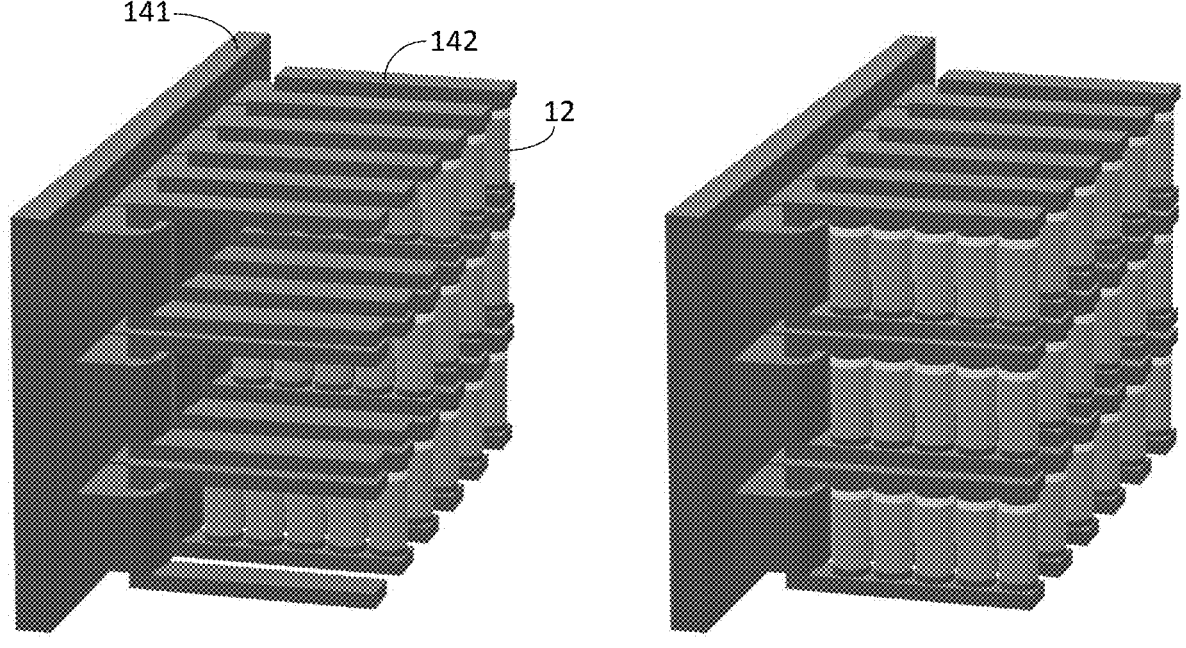
Figure 11A                                             Figure 11B Figure 10A
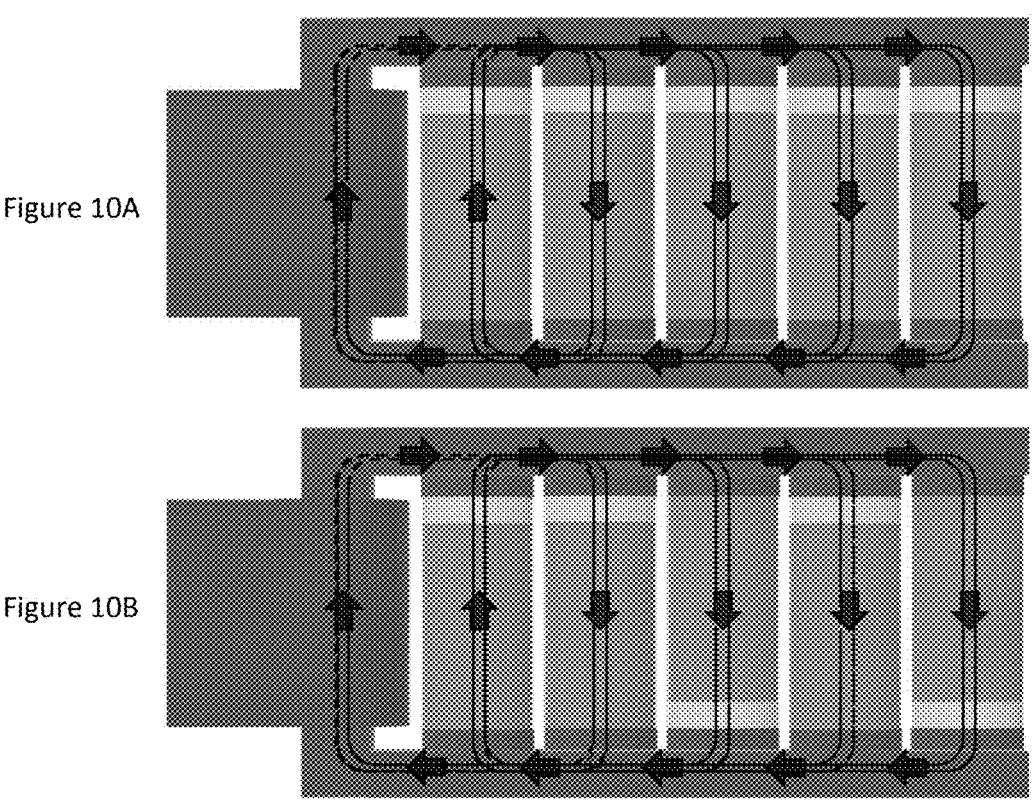
Figure 10B
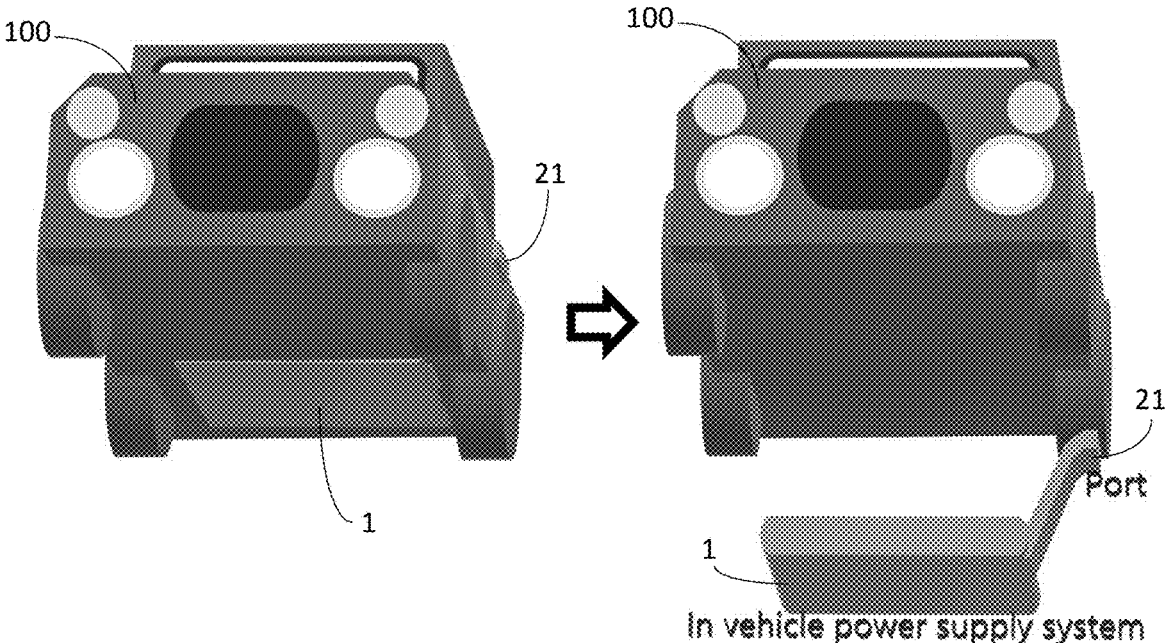
Figure 12

POWER SUPPLY SYSTEM FOR ELECTRIC VEHICLES

BACKGROUND OF THE INVENTION

Field of the Invention

This invention relates to a power supply system for electrical vehicles, and in particular, it relates to a battery power supply system for electrical vehicles and related power cell exchange and charging station, as well as related methods of operation and utilization.

Description of Related Art

Electrical vehicles are becoming more popular. However, current battery based power supply systems for electrical vehicles still suffer from problems such as insufficient power capacity which limits the range of the vehicle, long charging time for end users, battery life, lack of flexibility, safety and reliability issues, etc.

SUMMARY

Embodiments of the present invention provide a power supply system for electric vehicles. The power supply system includes the following parts: an in-vehicle power supply system, and a power cell exchange and charging station and related power system. Embodiments of the present invention also provide various methods of operating and utilizing the power supply system.

The power supply system according to embodiments of the present invention has the following advantages and benefits. It can reduce the time required for power transfer to an electric vehicle. It can alleviate concerns of electric vehicle owners and end users regarding battery life span. It can reduce purchase and maintenance cost of electric vehicle owners and end users. It can reduce the pressure on electricity distribution network due to ever increasing charging station, especially super charging stations. It can facilitate adoption of electric vehicles. It can improve reliability of electric vehicles. It can extend lifetime (cycle time) of battery and slow down degradation of battery performance. It can improve vehicle performance. It can increase flexibility and enhance robustness of power grid within an area. It can improve power supply performance, quality and stability at homes in which electric vehicles are kept and reduce cost of energy for homeowners.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a power supply system, which includes: a plurality of power cells each having one or more battery cells and a cell-side power converter, the cell-side power converter including a cell-side magnetic core; at least one power pod, each power pod having a pod-side power converter which includes a pod-side magnetic core; wherein each power cell is held by one of the at least one power pod, wherein the cell-side magnetic core of the power cell is in mechanical contact with the pod-side magnetic core of power pod to form a closed loop, wherein the power cell is configured to form magnetic field coupling with the power pod to transfer power bidirectionally between the power cell and the power pod; a system power bus electrically coupled to each power pod; and a mechanical transport system configured to mechanically move the power cells relative to the at least one power pod.

In some embodiments, each power cell further includes a cell-side control unit coupled to the cell-side power converter and configured to control the cell-side power converter, and each power pod further includes a pod-side control unit coupled to the pod-side power converter and configured to control the pod-side power converter.

In some embodiments, in each power pod, the pod-side magnetic core has a first end and a second end, and wherein in each power cell held by the power pod, the cell-side magnetic core has a first end and a second end, and wherein the first end of the cell-side magnetic core is in mechanical contact with one of the first and second ends of the pod-side magnetic core of a power pod, and the second end of the cell-side magnetic core is in mechanical contact the other one of the first and second ends of the pod-side magnetic core.

In some embodiments, either: the cell-side control unit of each power cell is configured to measure a frequency and a phase of a magnetic field in the cell-side magnetic core and to control the cell-side power converter based on a result of the measurement, or: the cell-side control unit of each power cell is configured to receive, from the pod-side control unit, information regarding frequency and phase of a magnetic field in the pod-side magnetic core and to control the cell-side power converter based on the received information.

In some embodiments, the power pod and the power cells held by the power pod are configured to transfer power from the power pod to at least one of the power cells using magnetic field coupling of a first frequency and to transfer power from at least another one of the power cells to the power pod using magnetic field coupling of a second frequency which is different from the first frequency.

In some embodiments, the power pod and the power cells held by the power pod are configured to simultaneously transfer power from at least one of the power cells to at least another one of the power cells and to the power pod using magnetic field coupling.

In some embodiments, the cell-side control unit of each power cell and the pod-side control unit of the power pod that holds the power cell are configured to communicate data and commands with each other by magnetic field coupling.

In some embodiments, the magnetic field coupling used to transfer power bidirectionally between the power cells and the power pod has first frequencies, and the magnetic field coupling used to communicate data and commands between the cell-side control units and the pod-side control unit has second frequencies which are different from the first frequencies.

In some embodiments, the cell-side control unit of each power cell is configured to read or record history and status information relating to operation of the power cell and to communicate the recorded history and status information to the pod-side control unit of the power pod that holds the power cell, wherein the history and status information includes one or more of: battery cell status, power cell identification or serial number, power cell model number, charge and discharge status power cell, power cell exchange and charging station or pump information, power cell charge or discharge lock or unlock status, and power cell permanent disable status.

In some embodiments, the power supply system has a plurality of power pods, wherein at least some of the power pods include a different number of power cells than at least some other power pods.

In some embodiments, the power supply system further includes a system controller electrically coupled to and configured to communicate with the pod-side control unit of each power pod, wherein the system controller is configured to perform load balancing among the plurality of power pods.

In some embodiments, all power cells have the same mechanical size, and have the same or different energy storage capacities.

In some embodiments, in each power cell, the cell-side magnetic core has an elongated rod shape, and wherein the battery cells are disposed within a container disposed around or beside the magnetic core.

In some embodiments, in each power pod, the pod-side magnetic core has two parallel arms and a connecting portion connecting the two arms, and wherein a coil of the pod-side power converter is wound around the connecting portion of the magnetic core, and wherein the cell-side magnetic cores of a plurality of power cell are held between the two arms of the pod-side magnetic core.

In some embodiments, each power cell further includes a battery cell disable agent.

In some embodiments, the power supply system further includes an enclosure that encloses the plurality of power cells, the at least one power pod, and the mechanical transport system, wherein the enclosure has an access port, and wherein the mechanical transport system is configured to move any power cell from any power pod to the access port and from the access port to any power pod.

In some embodiments, the plurality of power cells in the power supply system form a power cell network, and wherein the system controller is configured to performs load balancing among the plurality of power pods using a predefined method. In some embodiments, the predefined method utilizes artificial intelligent and machine learning techniques.

In another aspect, the present invention provides a power supply network formed by multiple connected vehicles, wherein each vehicle includes a power supply system according to the above aspects and embodiments, and is connected to a power grid.

In some embodiments, operations of the power supply network is based on a predefined method. In some embodiments, the predefined method utilizes artificial intelligent and machine learning techniques.

In another aspect, the present invention provides a power cell exchange station, which includes: a power cell storage; and a plurality of power cell exchange pumps connected to the power cell storage; wherein the power cell storage includes: a plurality of power cells each having one or more battery cells and a cell-side power converter, the cell-side power converter including a cell-side magnetic core; at plurality of power pods, each power pod having a pod-side power converter which includes a pod-side magnetic core and is coupled to an external electrical power source; wherein each power cell is held by one of the plurality of power pods, wherein the cell-side magnetic core of the power cell is in mechanical contact with the pod-side magnetic core of power pod to form a closed loop, wherein the power cell is configured to form magnetic field coupling with the power pod to transfer power bidirectionally between the power cell and the power pod; and a mechanical transport system configured to mechanically move the power cells between the power pods and the power cell exchange pumps; wherein the power cell exchange pumps is configured to mechanically coupled with an in-vehicle power supply system of a vehicle to load and unload power cells to and from the in-vehicle power supply system.

In various embodiments, the power cells and power pods of the power cell storage of the power cell exchange station have the various characteristics of the power cells and power pods of the power supply system described above.

In anther aspect, the present invention provides a method of operating an in-vehicle power supply system, which includes: providing a plurality of power cells, each having one or more battery cells, a cell-side power converter and a cell-side control unit, the cell-side power converter including a cell-side magnetic core; providing at least one power pod, each power pod having a pod-side power converter and a pod-side control unit, the pod-side power converter including a pod-side magnetic core; placing the cell-side magnetic cores of some of the power cells in mechanical contact with the pod-side magnetic core of one of the at least one power pod to form a closed loop; transferring power to the power pod from a first one of the power cells in contact with the power pod by magnetic field coupling; transferring power from the power pod to the first power cell or a second one of the power cells in contact with the power pod by magnetic field coupling; and by a mechanical transport system, mechanically moving some of the power cells away from the power pod, and moving some other power cells and placing the cell-side magnetic cores of the other power cells in mechanical contact with the pod-side magnetic core of the power pod.

In some embodiments, the method further includes unloading depleted or partially depleted power cells from the in-vehicle power supply system and loading charged power cells from a power cell exchange station.

In some embodiments, the transferring of power to the power pod from the first power cell uses magnetic field signals of a first frequency, and the transferring of power from the power pod to the second power cell uses magnetic field signals of a second frequency which is different from the first frequency, and wherein the transferring of power to the power pod from the first power cell and the transferring of power from the power pod to the second power cell occur simultaneously.

In some embodiments, the method further includes, while transferring power to the power pod from the first power cell, simultaneously transferring power to a third one of the power cells from the first power cell.

In some embodiments, the method further includes: by the power pod or some of the power cells, generating magnetic fields for power transmission; by the cell-side power converter of each power cell, or by the pod-side power converter of the power pod, converting magnetic power to electrical power or converting electrical power to magnetic power; by the pod-side control unit of the power pod, controlling the pod-side power converter; and by the cell-side control unit of each power cell, controlling the cell-side power converter based on either: measuring a frequency and a phase of a magnetic field in the cell-side magnetic core, or: receiving, from the pod-side control unit, information regarding a frequency and a phase of a magnetic field in the pod-side magnetic core.

In some embodiments, the method further includes: by the cell-side control unit of each power cell, reading and recording history and status information relating to operation of the power cell, wherein the history and status information includes one or more of: battery cell status, power cell identification or serial number, power cell model number, charge and discharge status power cell, power cell exchange and charging station or pump information, power cell charge or discharge lock or unlock status, and power cell permanent disable status; and communicating data and commands between the pod-side control unit of a power pod and the cell-side control unit of each power cell in contact with the power pod, by magnetic field coupling using a third frequency which is different from the first and second frequencies.

It is to be understood that both the foregoing general description and the following detailed description are exemplary and explanatory and are intended to provide further explanation of the invention as claimed.

BRIEF DESCRIPTION OF THE DRAWINGS

FIG. 5A shows the power pod without power cells inserted; FIG. 5B shows the power pod with power cells inserted.

FIG. 6 is a schematic block diagram of a power pod with power cell inserted according to embodiments of the present invention.

FIGS. 7A-7B, 8A-8B, 9A-9D and 10A-10B schematically illustrate examples of instantaneous directions of the magnetic fields within the magnetic cores of the power pod and power cells under different power transfer situations according to embodiments of the present invention.

FIGS. 11A and 11B schematically illustrate a portion of an in-vehicle power supply system according to embodiments of the present invention. FIG. 11A shows the portion of the in-vehicle power supply system with a partially filled power cell array; FIG. 11B shows the portion of the in-vehicle power supply system with a fully filled power cell array.

FIG. 12 schematically illustrates an exemplary location of an in-vehicle power supply system in a vehicle according to embodiments of the present invention.

DETAILED DESCRIPTION OF PREFERRED EMBODIMENTS

Figure 1:
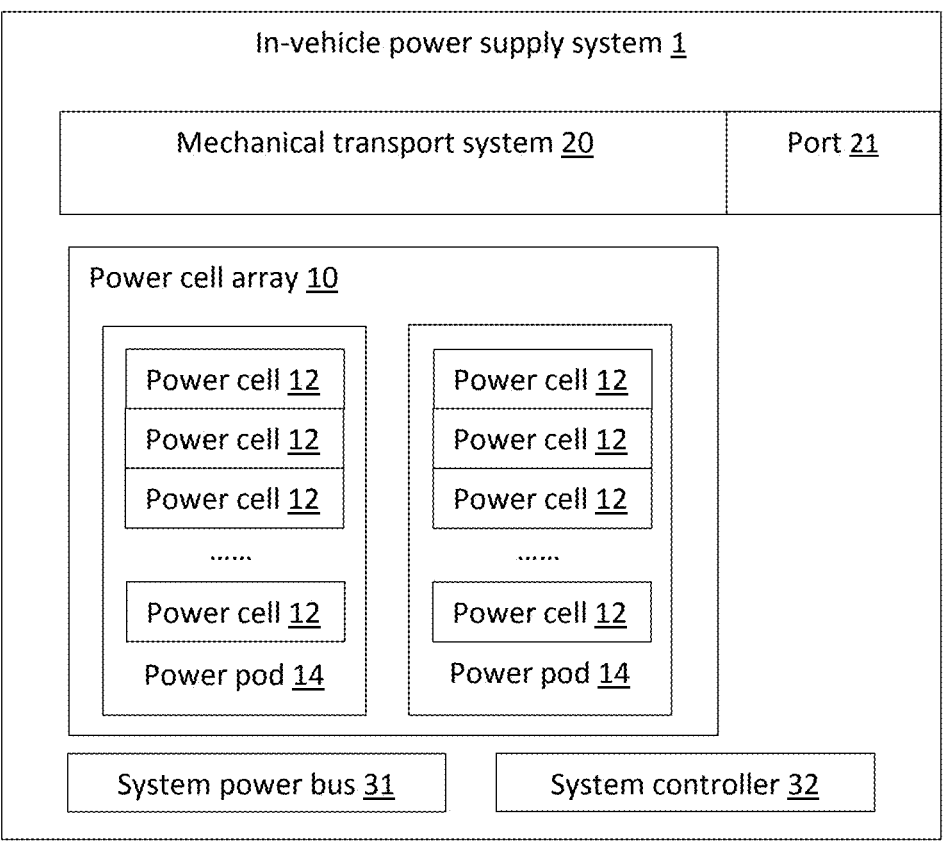
FIG. 1 is a schematic block diagram which illustrates an overall structure of an in-vehicle power supply system according to embodiments of the present invention.

The overall structure of an in-vehicle power supply system 1 according to a first aspect of the present invention is schematically illustrated in FIG. 1. The power supply system 1 in each electric vehicle includes a power cell array 10 which contains a large number of power cells 12, preferably of the same mechanical size. The power cell arrays in different electric vehicles may have different capacities for holding different numbers of power cells. This difference enables electric vehicles of different types and sizes to use power cells of the same mechanical size. Here, the mechanical size refers to the mechanical dimensions of the power cell, not the energy storage capacity of the power cell. Power cells with the same mechanical size may have different energy storage capacities and performance; e.g., some may be designed to deliver large amount of energy within a short period of time, while others may be designed for light loads and have longer charge holding period (i.e. low self-discharge) and longer life span.

The in-vehicle power supply system 1 also has a built-in mechanical transport system 20 to hold power cells 12 and physically move any power cell inside the system to an access port 21 of the in-vehicle power supply system which extend to an opening or port of the vehicle for purposes of power cell exchange. The mechanical transport system 20 includes both support structures for supporting and securing the power cells in place and a conveying system for moving the power cells; it is constructed such that any power cell 12 in the power supply system can be mechanically moved in any directions e.g., x, y, and z directions. The mechanical transport system 20 has the ability to move any power cell in the array to the port 21 and put a power cell from the port 21 to any location in the power cell array. At a power cell exchange station, moving power cells 12 to the port 21 and moving power cells from the port into the power cell array can happen within different periods of time, or at the same time (for example, if the port 21 is sufficiently large to accommodate two or more power cells passing through it simultaneously). The latter will help shorten the period of exchanging the power cells in the power cell array in the vehicle. This will shorten the period of time power is transferred to the vehicle at a power cell exchange station.

The mechanical transport system 20 may have any suitable structure so long as it can meet the requirements described in this disclosure. Mechanical support and conveying systems are widely used in manufacturing, transportation, logistics and countless other industrial and other fields. Those of ordinary skill in the relevant art can implement a mechanical transport system 20 suitable for the in-vehicle power supply system, based on descriptions of this disclosure, without undue experimentation. The mechanical transport system 20 may include, for example and without limitation, some of the following mechanical components: guide rails, belts, chains, gears, racks, levers, rollers, pivots, clamps, springs, magnets, electromagnets, motors and actuators, robotic arms, etc., and their combinations. The mechanical transport system 20 also includes all necessary control components, which may be electrical circuitry and/or controllers electrically coupled to a system controller 32 (described in more detail later), to control the movements of the various mechanical components of the mechanical transport system.

The power cell array 10 in an electric vehicle can be fully or partially filled with power cells 12 depending on the needs of the end user. An electric vehicle can operate normally with a partially filled power cell array. During operation, all or part of the power cells held in the power cell array can provide power to the vehicle. A strategy can be designed to drain power from the power cells in the power supply system in a specified order or based on specified criteria. The in-vehicle power supply system 1 is capable of draining power from designated power cells 12 in its power cell array 10 and exchanging information between other components of the vehicle and each power cell. The in-vehicle power supply system can also transfer power from some power cells to other power cells within the power cell array.

Figure 2:
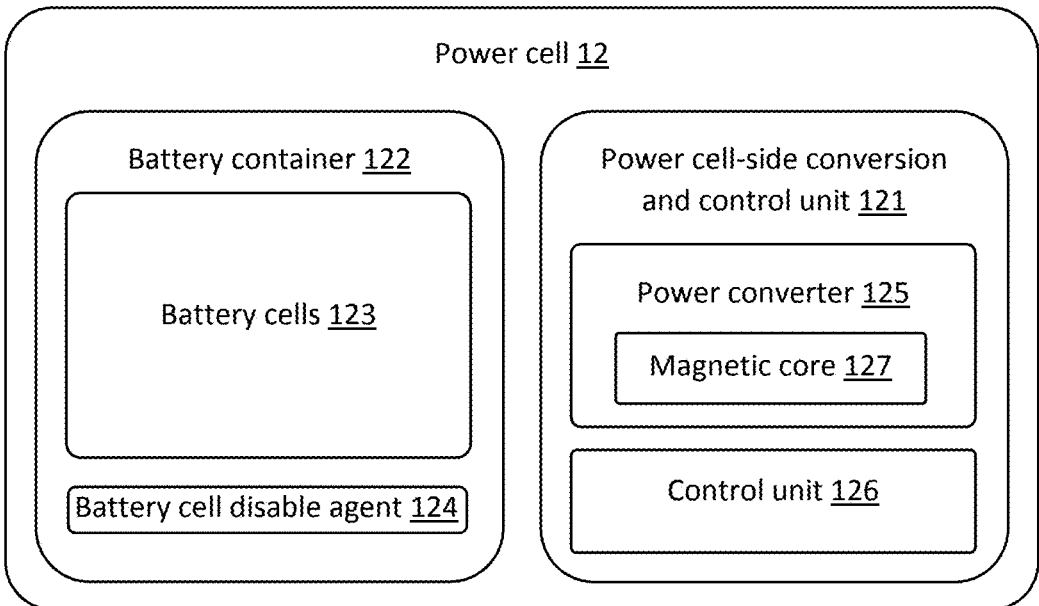
FIG. 2 is a schematic block diagram of a power cell of the in-vehicle power supply system according to embodiments of the present invention.

FIG. 2 shows an example of block diagram of a power cell 12 according to an embodiment of the present invention. The power cell 12 includes a power cell-side conversion and control unit 121 and a battery container 122. Battery cell or cells 123 are held within the battery container 122. In addition, an optional battery cell disable agent 124 (for example a chemical substance for a chemical battery) can also be included in the battery container. This battery cell disable agent can improve the safety of the in-vehicle power supply system and the safety of the vehicle. In an emergency, e.g., when sensors in the vehicle or in the power supply system 1 detect a possible collision, or an extreme high temperature, which may cause fire in battery cells, the power cell-side conversion and control unit 121 will activate the battery cell disable agent 124 to chemically disable the battery cell 123 if the battery cell in the power cell is a chemical battery. In another example, the power cell-side conversion and control unit 121 may activate the battery cell disable agent 124 when a leakage of the chemical battery cells is detected, or when other defects of the chemical battery cells is detected.

Two sub-components in the power cell-side conversion and control unit 121 are a power converter 125 and a control unit 126. The control unit 126 (which includes electronic circuits and/or programmable controllers and/or other suitable components) controls the operation in the power cell 12 and communicates with a pod-side conversion and control unit (described later) so that information can be exchanged between the power cell 12 and other components of the in-vehicle power supply system 1. In addition, control commands can be sent from other components of the power supply system 1 to the control unit 126 of each power cell 12.

The control unit 126 may have the following additional functions: charge and discharge control function, protection function control, battery health monitor function (including structure integrity check which may include battery container leakage detection function), battery history recording function such as battery charge and discharge history recording function, energy use history recording function (which car used the battery cell in which time interval; when the battery cell is discharged and when it is charged, etc.), exchange station history recording function (at which exchange station the battery cell is charged, when it is put into a vehicle, etc.), error or malfunction history recording function (when and where it had malfunction), usage or life of the battery cell recording function (occurrences of over current during discharge, over or under temperature during charge or discharge, strong impact history, etc.), security lock function (power cells can only be activate after authorized exchange, and car can be deeply locked by locking the battery cells in it), battery cell disable agent control, etc. The authorization can also be made through the control system in the vehicle which communicates with the power exchange station or the power cell supplier through any wireless communication network e.g., Wi-Fi or cell phone network. These various history recording functions may be performed by a processor with a memory within the control unit 126, where the information being recorded is obtained from sensors within the power cell 12 and elsewhere in the vehicle as well as from external information sources such as the exchange station. The various history recording functions listed above may be implemented in methods generally known in the art and are not described in detail here.

The power converter 125 is controlled by the corresponding control unit 126, and functions to drain power from the battery cells 123 and convert the power from an electrical form to a magnetic field form. It may contain one or more coils (not shown in the drawings) wound around a magnetic core 127 located within the power cell. AC electrical signals generated by the power converter 125 is used to drive the coil to generate a magnetic field in the magnetic core. The power converter 125 can also drain power from the magnetic field in the core and use it to power the control unit 126 and charge the battery cells 123. Battery cell protection circuits are also included in the converter 125 to protect the battery cell and the control unit. One implementation example of the converter 125 includes an oscillator which drains power from the battery cells 123 and generates AC electric signals to drive the coil, and a rectifier circuit which generates DC electrical signals to charge the battery cells.

The AC signals which is used to transfer power from the power cells to the power pod (described in more detail later) which holds the power cells or from the power pod to the power cells, or between the power cells held by the same power pod, may have different frequencies from that of the signals used for the data communication between power cells and power pod in the in-vehicle power supply system. This ensures that both power transfer and data communication between power cells and power pod can be conducted at that same time without interference from each other.

Figure 3:
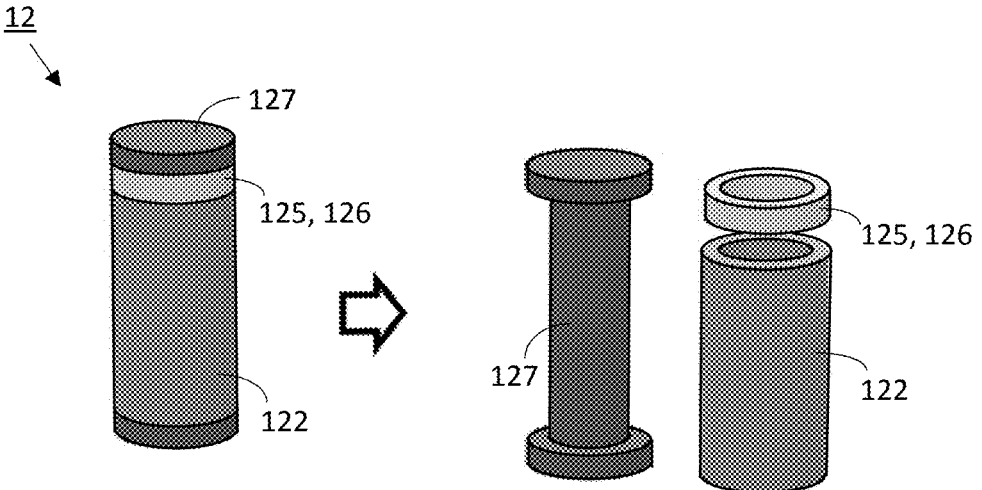
FIG. 3 schematically illustrates the structure of a power cell according to embodiments of the present invention.

FIG. 3 schematically illustrates an exemplary structure of a power cell 12. Please note the drawing is not to scale; the purpose of the figure is to show the way a power cell 12 may be constructed. The magnetic core 127 in the power cell 12 is surrounded by the power converter 125 and control unit 126 of the power cell-side conversion and control unit 121 and the battery container 122. The magnetic core 127 is preferably an elongated rod shape with two flat end faces at the two ends, and the power converter 125 and control unit 126, and the battery container 122 (containing the battery cells) may be shaped as cylinders and disposed around the magnetic core as schematically illustrated in FIG. 3 (disassembled view on the right hand side). Note that the control unit 126 and the battery container 122 are not required to be disposed around the magnetic core; only the coils of the power converter 125 is required to be disposed around the core 127. Also, the magnetic core 127 may have any suitable cross-sectional shape, such as round, oval, polygonal, etc.; FIG. 3 illustrates a round shape as one example. The two ends of the magnetic core 127 will be in contact with the magnetic core of the power pod in the power cell array of the in-vehicle power supply system, described in more detail later.

Figure 4:
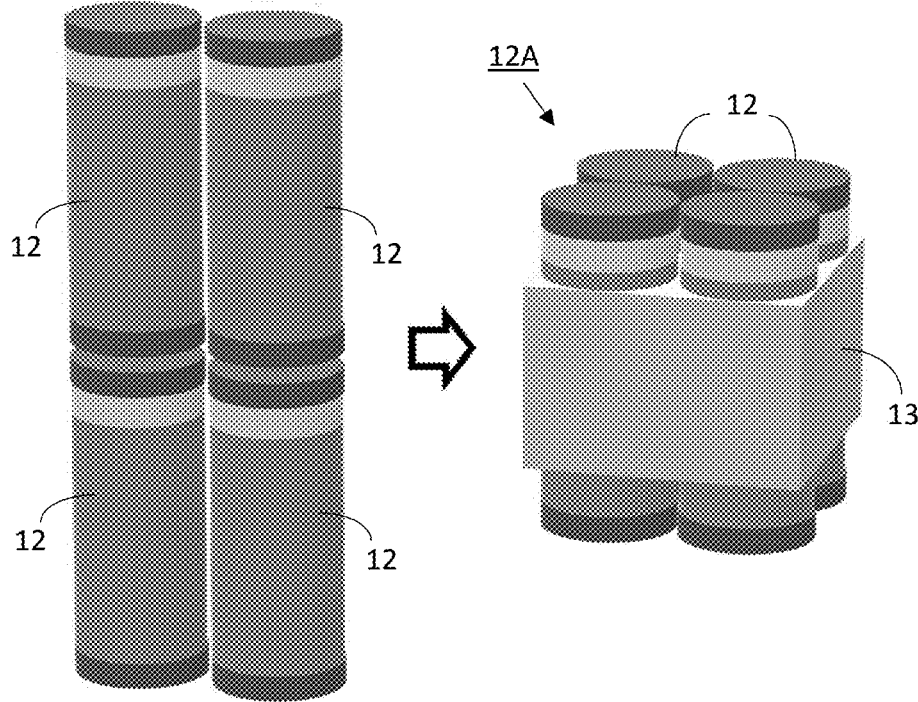
FIG. 4 schematically illustrates an example of a larger power cell formed of power cells of a smaller size according to an embodiment of the present invention.

Smaller power cells 12 can be combined into larger ones, as schematically shown in FIG. 4. Different types of cars may use the same or different power cells of different sizes, but power cells of different sizes can be eventually broken down to power cells of the same size. In other words, the fundamental building block of the power supply system 1 can be the same sized power cells 12. In FIG. 4, one example of using four power cells 12 of smaller sizes to form one power cell 12A of a larger size is illustrated (unassembled view on the left hand side; assembled view on the right hand side). In the illustrated example, four smaller power cells 12 are arranged in parallel and mechanically jointed together by suitable means 13 such as a clamp, a block with four slots, etc., with the ends of their magnetic cores of the power cells flush with each other.

Figure 5A:
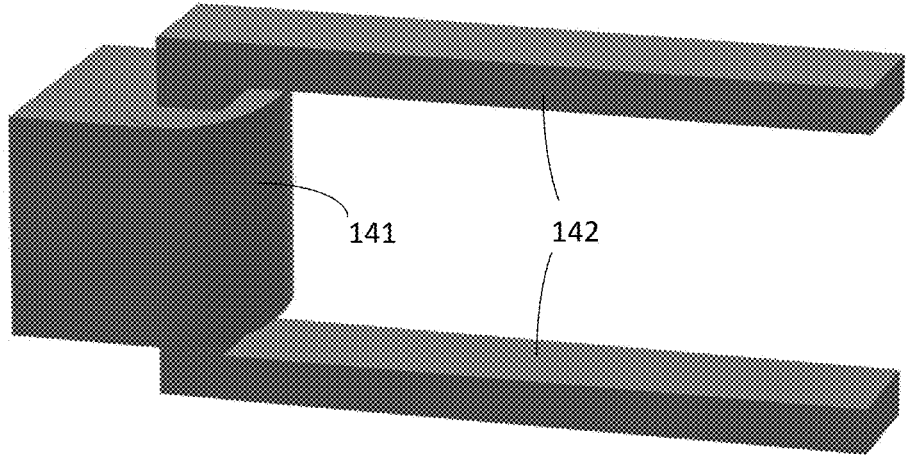
FIGS. 5A and 5B schematically illustrate an exemplary power pod according to embodiments of the present invention.

In the in-vehicle power supply system, the power cell array 10 is formed by power cells 12 held in one or more power pods 14 (see FIG. 1). Each power pod 14 can hold up to a predefined number of power cells 12. An example of a power pod 14 which can hold up to five power cells 12 is shown in FIGS. 5A (without inserted power cells) and 5B (with inserted power cells). FIG. 6 shows is a schematic block diagram of a power pod 14 holding a number of power cells 12.

As shown in FIG. 6, each power pod 14 includes a pod-side conversion and control unit 141, which includes a pod-side power converter 143 and a pod-side control unit 144. The power converter 143 is electrically coupled to a system power bus 31, and includes a pod-side magnetic core 142 and one or more coils (not shown) wound around the magnetic core. The power converter 143 functions to convert power between an electrical form on the system power bus 31 and a magnetic field form in the magnetic core 142. Similar to the power converter 125 of the power cell 12, the power converter 143 may include an oscillator and a rectifier circuit. Through the power converters 125 and 143 and the magnetic cores 127 and 142, power is transferred between the system bus 31 and the power cells 12 via inductive coupling.

Figure 5B:
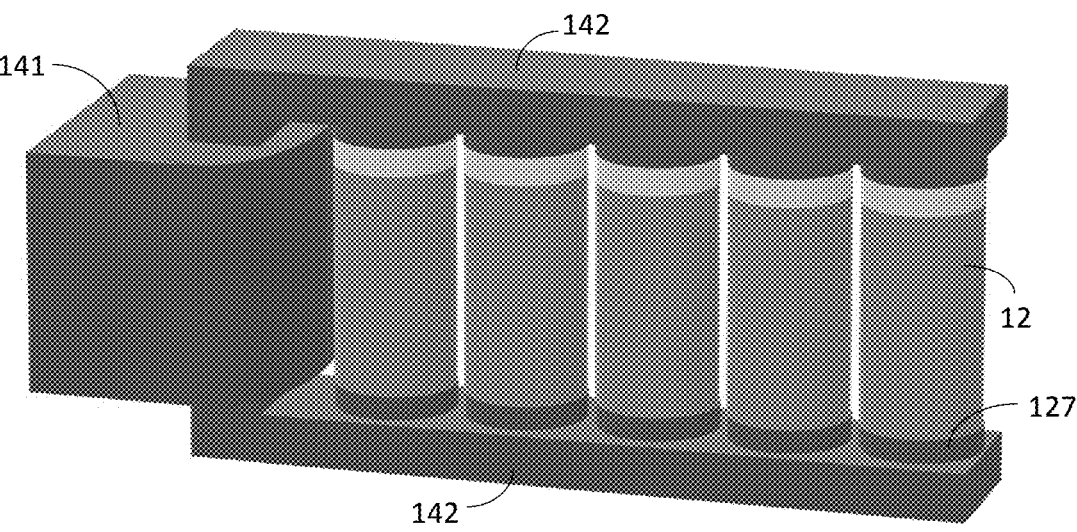

As shown in FIGS. 5A and 5B, the pod-side magnetic core 142 preferably has a sideways U shape with two straight arms in parallel, which are respectively in direct mechanical contact with the two ends of the magnetic core 127 of each power cell 12 inserted in the power pod 14. In other words, each cell-side magnetic core 127 is held between the two arms of the pod-side magnetic core 142 and the magnetic cores contact each other to form a closed loop. Note that the end faces of the cell-side magnetic core 127 and the portions of the pod-side magnetic core 142 that contact each other are not required to be flat faces, but can be other shapes that match each other. The multiple power cells 12 in the pod are preferably arranged in a linear array along the arms of the pod-side magnetic core 142. The coils of the pod-side power converter 143 are preferably wound around the connecting part of the pod-side magnetic core 142 that connects the two arms.

Power is transferred between power cells 12 and the power pod 14 which is holding the power cells through the magnetic field coupling established by the magnetic cores 127 and 142 in the power cells and the power pod. This power transfer can be bidirectional, i.e., either from a power cell 12 to the power pod 14, or from the power pod 14 to a power cell 12. This is schematically indicated in FIG. 6 by the double-ended arrows between the power cells 12 and the pod-side conversion and control unit 141. Further, bidirectional power transfer can happen within the same power pod 14 between power cells 12, e.g., power may be transferred from one power cell to the power pod and simultaneously from the power pod to a different power cell, or between power cells, as schematically indicated in FIG. 6 by the double-ended arrows between power cells 12. The ability to transfer power bidirectionally to different power cells simultaneously achieves load balancing, energy storage balancing and wear balancing among the power cells. All of these power transfers occur by magnetic field coupling via the magnetic cores.

In addition to bidirectional power transfer, bidirectional communications of data (digital or analog) can also be established between power cells 12 and the power pod 14 through the aforementioned magnetic field coupling. As mentioned earlier, magnetic field couplings of different frequencies are used for power transfer and data communication.

By using magnetic field coupling rather than direct electrical connections or contacts to achieve power transfer, the reliability of the power transfer between the power cell and the rest part of the power supply system is dramatically improved. Additional characteristics and benefits of the magnetic field coupling power transfer include the following.

First, unlike traditional battery bundles, the power cells according to embodiments of the present invention are not sensitive to moisture and dust. This makes the design suitable for harsh environment applications not limited to passenger cars. It will eliminate short circuits caused damages and creepage induced safety issues in battery bundles.

Second, this structure provides improved life span of power cells 12 due to removal of direct electrical contacts. It will eliminate corrosions in the contacts and related performance loss.

Third, the power output of a single power pod 14 can be easily increased by placing and operating more power cells 12 in parallel so that the magnetic fields from the power cells can be directly summed. By parallel more power cells in a power pod, the maximum magnetic flex can be increased in the core if the core is not saturated. This will directly increase the voltage in the secondary winding (i.e. the coil in the power pod) when multiple power cells in parallel are outputting power. On the contrary, in order to increase the output power or voltage of a traditional battery bundle, the traditional battery cells typically need to be put in series rather than in parallel. Putting serval battery cells in series will increase the overall output voltage of the battery bundle, but the source impedance is also increased in proportion to the output voltage; in addition, when the output reach certain levels, safety issues need to be considered and better isolation need to be provided. In embodiments of the present invention, the parallel operation of power cells 12 also helps to improve the overall power supply system reliability in a vehicle. In existing electric vehicles, if one battery cell fails, the other battery cells in series with the failed battery cell will also quit working. Thus, one failed battery cell may cause tens or hundreds of battery cells that are still functional to quit operation. In the power supply system according to embodiments of the present invention, any power cell 12 with a malfunctioning battery cell 123 or any power cell which is otherwise malfunctioning can be disabled individually (e.g. via commands to the control unit 126) without affecting the operation of other power cells.

Fourth, the magnetic field power transfer eliminates arcing even under heavy loads. On the contrary, a traditional battery bundle needs high output voltage for heavy loads, which increases the chance of arcing. Arcing possibility may be a concern for certain applications.

Fifth, the assembling of power cells 12 in the power supply system is not sensitive to the polarity of the power cells. In the power supply system, the two arms of each pod-side magnetic core 142 may be respectively referred to as first and second ends, and the two ends of each cell-side magnetic core 127 may be respectively referred to as the first and second ends, for convenience. Here, not being sensitive to the polarity of the power cell means that each power cell 12 may be placed in a power pod 14 with the first end of the cell-side magnetic core contacting either the first end of the pod-side magnetic core, or the second end of the pod-side magnetic core, without affecting the overall operation of the system. Traditional battery packs using battery cells need to make sure that all the battery cells are connected in the right way according to the polarity of each battery cell.

In the power supply system according to embodiments of the present invention, the magnetic polarity or the phase of the varying magnetic field of each power cell 12 can be changed easily under the control of the power cell-side conversion and control unit 121 based on how each power cell 12 is put into the power pod 14, and how other power cells in the same power pod operate. For each power cell 12, no matter how the power cell is placed into the power pod 14, the cell-side control unit 126 can first measure the magnetic field in its magnetic core 127, for example using built-in magnetic field sensors. Then, if the power cell 12 is asked by the pod-side control unit 144 of the power pod 14 to provide power to the pod, the AC signal generated in the power converter 125 of the power cell can use the measurement results to synchronize the cell's output magnetic signal with the existing (i.e. previously measured) magnetic signal so that the magnetic field generated by this power cell is always synchronized (i.e. having identical frequencies and phases) with the existing magnetic signal at the location where the power is sent to, e.g., at the location where the power converter 143 of the power pod is located. Alternatively, the cell-side control unit 126 may communicate with the pod-side control unit 144 to receive information regarding frequency and phase of the magnetic field in the pod-side magnetic core 142 and the magnetic cores of the other power cells 12 in the power pod, and use the information to control its own power converter 125 to achieve synchronization.

The power converter 143 of the power pod 14 functions to direct power between power cells 12 and the system power bus 31 of the power supply system 1. The power converter 143 in the power pod uses the coil wound around the magnetic core 142 of the power pod to drain or pour power from or to power cells. The AC magnetic signal for draining power from power cells and the AC magnetic signal for transferring power to power cells can have different frequencies so that bidirectional power flows between power cells and the power pod and between different power cells within the power pod can happen at the same time without any interference between each other. The control unit 144 in the power pod 14 controls the operations in the power pod and communicates with both the power cells 12 held in the power pod and the system controller 32.

FIGS. 7A-7B, 8A-8B, 9A-9D and 10A-10B schematically illustrate examples of instantaneous directions of the magnetic fields within the magnetic cores of the power pod and power cells under different power transfer situations. It should be noted that the direction and strength of the magnetic fields are time-varying, and that each example here only illustrates the magnetic field at one time point.

Figures 7A, 7B, 8A, 8B:
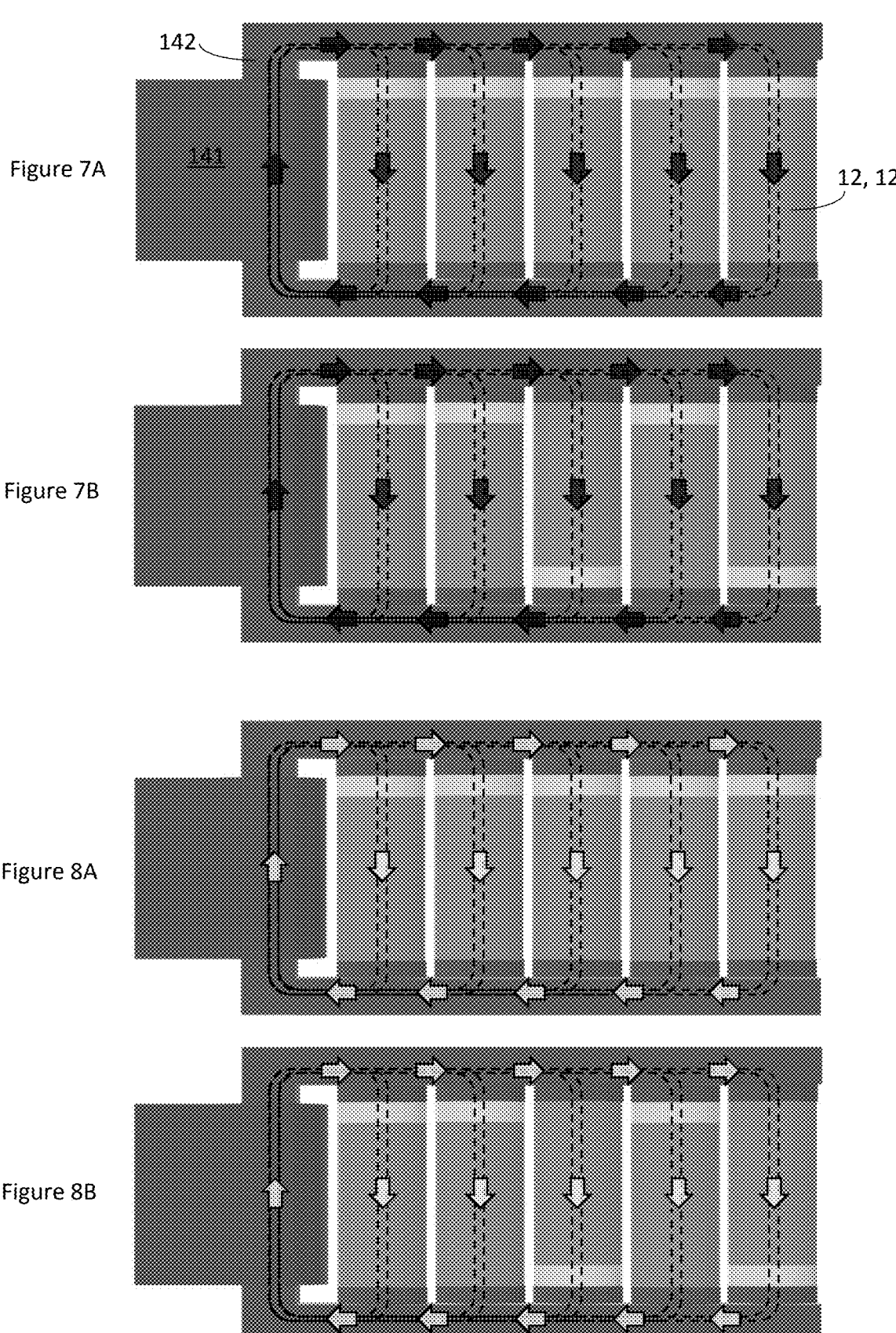
Figures 9A, 9B, 9C, 9D:
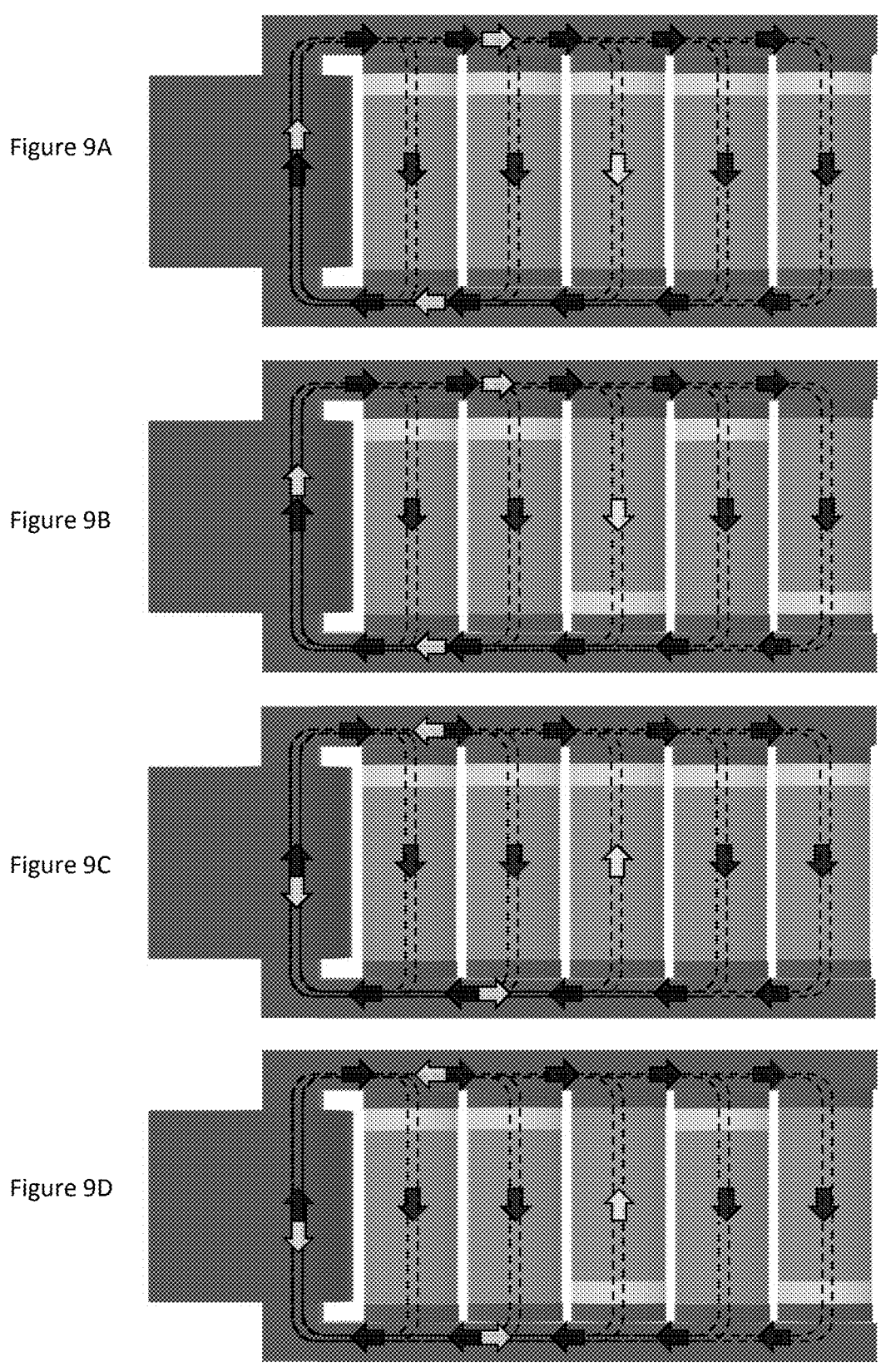

Example 1, FIGS. 7A and 7B: All the power cells are sending power to the power pod. In FIG. 7B, some power cells in the power pod have different placements (polarities) than other power cells, but this does not affect the magnetic fields in the various cores.

Example 2, FIGS. 8A and 8B: All the power cells are draining power from the power pod to recharge the cells. Again, in FIG. 8B, some power cells in the power pod have different placements.

Example 3, FIGS. 9A-9D: One power cell in the center is draining power from the power pod, and the other power cell are sending power to the power pod. The two operations are running at the same time but are using different frequency components of the magnetic signals (the different frequency components are schematically illustrated with different styled arrows: the solid arrows indicate the frequency component that sends power from the power cells to the power pod, and the hollow arrows indicate the frequency component that drains power from the power pod to recharge the power cells). Again, in FIGS. 9B and 9D, some power cells in the power pod have different placements.

Example 4, FIGS. 10A-10B: The power cell on the far left is draining power from the other four to its right. The four power cell are also sending power to the power pod. The two operations use the same frequency component of the magnetic signals. Again, in FIG. 10B, some power cells in the power pod have different placements.

The above figures just show some of the examples of the operation scenarios. There are unlimited number of additional combinations depending on the real use cases.

In addition to controlling the power transfer directions of the power cells, the control unit 144 in the power pod 14 also perform one or more of the following functions, without limitation.

The control unit 144 reads information from each power cell 12 and writes information to each power cell. The information can include but is not limited to: battery cell status in a power cell, power cell identification or serial number, power cell model number, charge and discharge status of a power cell, power cell exchange and charging station or pump information, power cell charge or discharge lock or unlock, power cell permanent disable, the signal frequencies for power transfer, the signal frequencies for communications of different purposes, etc. The control unit 144 performs power pod and power pod protection related control function, load balance among power cells in the power pod, and power pod status updates to the system power bus.

FIGS. 11A and 11B show one portion of an in-vehicle power supply system according to embodiments of the present invention, which includes a power cell array formed by power pods. In the figures, the mechanical transport system for power cell transportation within the power cell array is not shown. As mentioned previously, the power supply system can work properly with fully or partially filled power cell array. In FIG. 11A, a partially filled power cell array is shown; in FIG. 11B, a fully filled power array is shown. The mechanical transport system can move power cells in and out of any of the power pods.

The in-vehicle power supply system 1 also includes a system controller 32 (see FIG. 1). It can communicate with each power pod 14 in the power cell array 10 directly (e.g. by electrical signals) and with each power cell 12 in the power cell array through the corresponding power pod control unit 144. In this way, information can be exchanged between the power system controller 32 and each power cell 12. Load balance among power pods or even among power cells within the power cell array can be achieved by the system controller. The system controller 32 also communicates with and controls the mechanical transport system 20.

In a vehicle, the array of power cells and power pods form an in-vehicle power supply network. Based on needs, the operation and configuration of the network can be quite flexible. This can help better fit the needs and reduce the cost to the user and improve the performance of the system. The system controller 32 can use AI (artificial intelligence) and machine learning to optimize the performance of the power cell network inside a vehicle.

The in-vehicle power supply system 1 can also be compatible with existing charging station for existing electric cars. It can use the existing charging station to charge the power cells in the power cell array just like for the existing electric cars.

Figure 13:
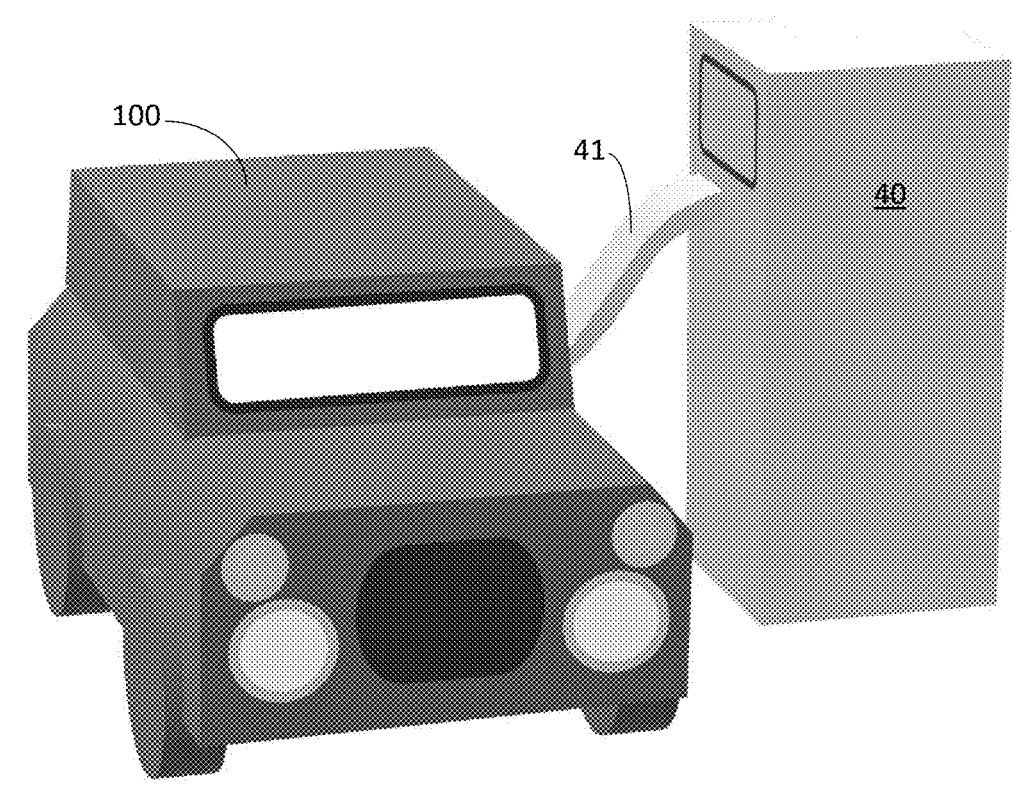
FIG. 13 schematically illustrates a scenario of power cell exchange between a vehicle and a pump at a power cell exchange and charging station according to embodiments of the present invention.

FIG. 12 shows an example about where and how a power supply system 1 can be installed in a vehicle 100. FIG. 13 illustrated the scenario when a vehicle 100 is parked in front of a power cell exchange and charging pump 40 for power cell exchange. As shown in FIG. 12, the in-vehicle power supply system 1 is enclosed in an enclosure which may be located at the base of the vehicle body, with the port 21 of the enclosure open on a side of the vehicle body for convenient power cell exchange. The right hand side of FIG. 12 shows an unassembled view of the power supply system 1 and the vehicle 100. The power cell exchange and charging pump 40 may have an arm or conduit 41 that can connect to or engage with the port 21 of the in-vehicle power supply system 1 for power cell exchange.

Figure 14:
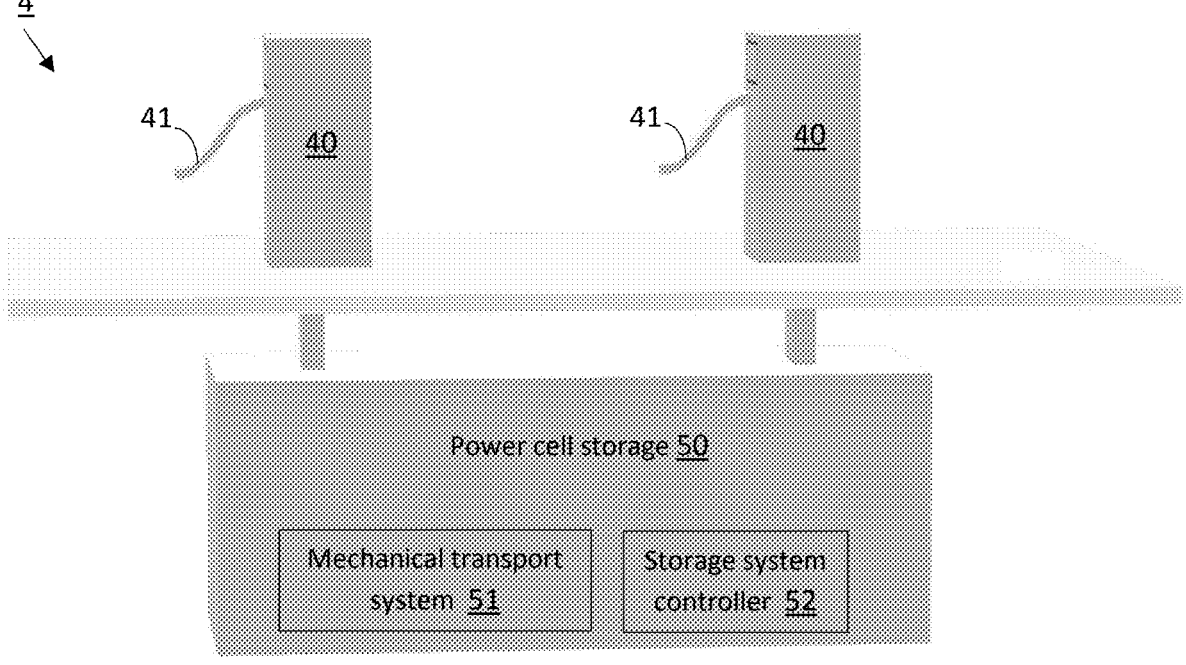
FIG. 14 schematically illustrates the structure of a power cell exchange and charging station according to embodiments of the present invention.

FIG. 14 presents a schematic diagram of the structure of a power cell exchange and charging station. The power cell exchange and charging station 4 has a plurality of power cell exchange pumps 40 connected to a power cell storage 50 which may be located underground. The power cell exchange pump 40 can take depleted power cells from a vehicle and put them into the underground power cell storage 50 for storage and recharge. The power cell exchange pump can also load charged power cells to the vehicle which needs refreshed power cells. Suitable mechanical transport systems 51 are provided in the power cell exchange and charging pump 40 and the power cell storage 50 to accomplished transporting of power cells and loading and unloading of power cells into and from the in-vehicle power supply system 1. The mechanical transport systems 51 may employ similar components described earlier in connection with the mechanical transport system 20. Those of ordinary skill in the relevant art can implement a suitable mechanical transport structure without undue experimentation.

The structure of the underground power cell storage 50 may be similar to the in-vehicle power supply system 1. For example, power pods are provided to hold power cells. The different is the capacity of the power cell array. The power cell array in an underground power cell storage 50 is much larger than that of an in-vehicle power supply system, and can hold a large number of power cells. The power cell storage 50 further includes a storage system controller 52 which is connected to the power pods within the storage 50 and controls the charging and discharging of the power cells, as well as the operation of the mechanical transport systems 51.

The power cell exchange station 4 has a local energy harvest function. The exchange station can charge the depleted power cells from electric vehicles using power from the power grid, from solar cells, or other local electricity generators. Since it can charge those collected depleted power cells at a relatively low charging speed during nighttime instead of or in addition to during the daytime, it greatly reduces the pressure added by the ever increasing conventional charging stations for conventional electric cars during the daytime, especially those conventional super charging stations which must charge the electric vehicles at any time demanded by the vehicle users within a relatively short period of time. A relatively low charging speed also helps to extend the life span of the battery cells in the power cells. Normally the higher the speed of charging, the shorter the life span of a battery cell.

In addition, in the vehicle power supply system according to embodiments of the present invention, power cells can be arranged to provide power to the vehicle in a manner so that some but not all of the power cells in the power cell array in the vehicle provide power at certain moment. In this way, only after certain power cells are depleted, then other power cells in the same power cell array will be used to provide power to the vehicle. In this way, at the power cell exchange and charging station, only power cells that have been depleted will be exchanged. These power cells will be recharged at the power cell exchange and charging station.

Another scenario is that, the partially discharged power cells can be also collected at the exchange and charging station. Then the energy that remains in the power cells will be used to charge other power cells in the storage and charging structure or to provide power to the power grid or the electric vehicle that are charging at the station, then they will be recharged after they are depleted. In this way, the life span of the battery in the power cell can also be extended.

The power cell exchange and charging station can also act as a local energy storage and provide power supply under certain conditions to the surrounding areas. For example, if there is an unexpected power loss in certain area due to malfunction or problems in the power grid, the power cell exchange and charging station can provide emergency power supply to its surrounding areas. The station can also help to mitigate issues during the daytime due to the loading peaks within certain part of a power grid. For example, the power cell exchange and charging station can reserve part of the power cells to supply power during the daytime and recharge those cells during nighttime. This is helpful to maintain the local electrical power distribution network to run in a healthy way. On the other hand, the existing super charging stations, which must charge vehicles during daytime when demanded by vehicle users, put extra pressure on the electricity power distribution network during daytime. In addition, if there is a known or expected power loss or failure within certain areas, the power cell exchange and charging station can charge part of or all the power cell it stores within a short period of time at high speed for later backup power use.

The operation of the whole power system according to embodiments of the present invention can also be different from the current electric car eco system. This new system is still compatible with the existing system. Each electric vehicle can still be charged at the existing charging station as mentioned previously. The difference is that, in the new system, each electric vehicle is sold without power cells. These will greatly lower the cost of the vehicle to the end user. The power cells are only leased to each end user. Each end user can lease certain amount of power cells which may depend on their lease contract. This new system can be used not only in electric cars but also other electric vehicles e.g., electric bicycles, electric airplanes, electric boats and ships, etc.

Since all the depleted power cells will be collected by the exchange and charging stations, and all the fundamental building blocks of the power cells are the same, it also makes the recycling of the battery cells in the power cell much easier and reduce pollution during battery cell recycling.

The range and/or performance of the electric vehicles can be improved by replacing the power cells with newer or better battery cells based on better technology. This further lowers the cost of the end users and gives the end users more flexibility.

The in-vehicle power supply system according to embodiments of the present invention also improves safety. A bare battery can release its stored energy easily by any conductive loop between its positive and negative contacts. This makes them more dangerous. Power cells according to embodiments of the present invention, on the other hand, do not have this disadvantage. A power cell needs to be turned on by specified signals or access code provided from outside. It can also have load sensing capability. The combination of these two factors makes it much safer than traditional batteries.

In the situation when a vehicle is connected to a specially designed charger at a charging station or at home of the user instead of a power cell exchange pump, the vehicle is not only able to get power from the charger to charge the batteries it carries, it can also supply power. In this way the energy can flow in both directions between the connected vehicle and the charger, whenever a vehicle is connected to a charger no matter at a charging station or at home of the user. The connected vehicles in an area can form a power supply network and provide power storage function and supply power to the power grid or home if needed. AI and machine learning can be used to optimize the performance of the collaboration of multiple vehicles and charging stations when specific power flow pattern within the power grid of a specific area or at home is needed.

Various components and modules of the system described above, such as the cell-side power converter 125, cell-side control unit 126, pod-side power converter 143, pod-side control unit 144, power supply system controller 32, storage system controller 52, etc. may be implemented by electrical circuitry including logic circuits, and/or processors which execute computer executable program code stored in computer readable non-volatile memories.

It will be apparent to those skilled in the art that various modification and variations can be made in the in-vehicle power supply system, the power cell exchange and charging station, as well as related methods of the present invention without departing from the spirit or scope of the invention. Thus, it is intended that the present invention cover modifications and variations that come within the scope of the appended claims and their equivalents.

What is claimed is:

1. A method of operating an in-vehicle power supply system, comprising:

providing a plurality of power cells, each having one or more battery cells, a cell-side power converter and a cell-side control unit, the cell-side power converter including a cell-side magnetic core;

providing at least one power pod, each power pod having a pod-side power converter and a pod-side control unit, the pod-side power converter including a pod-side magnetic core;

placing the cell-side magnetic cores of some of the power cells in mechanical contact with the pod-side magnetic core of one of the at least one power pod to form a closed loop;

transferring power to the power pod from a first one of the power cells in contact with the power pod by magnetic field coupling;

transferring power from the power pod to the first power cell or a second one of the power cells in contact with the power pod by magnetic field coupling; and by a mechanical transport system, mechanically moving some of the power cells away from the power pod, and moving some other power cells and placing the cell-side magnetic cores of the other power cells in mechanical contact with the pod-side magnetic core of the power pod.

2. The method of operating an in-vehicle power supply system of claim 1, further comprising:

unloading depleted or partially depleted power cells from the in-vehicle power supply system and loading charged power cells from a power cell exchange station.

3. The method of operating an in-vehicle power supply system of claim 1, wherein the transferring of power to the power pod from the first power cell uses magnetic field signals of a first frequency, and the transferring of power from the power pod to the second power cell uses magnetic field signals of a second frequency which is different from the first frequency, and wherein the transferring of power to the power pod from the first power cell and the transferring of power from the power pod to the second power cell occur simultaneously.

4. The method of operating an in-vehicle power supply system of claim 1, further comprising:

while transferring power to the power pod from the first power cell, simultaneously transferring power to a third one of the power cells from the first power cell.

5. The method of operating an in-vehicle power supply system of claim 1, further comprising:

by the power pod or some of the power cells, generating magnetic fields for power transmission;

by the cell-side power converter of each power cell, or by the pod-side power converter of the power pod, converting magnetic power to electrical power or converting electrical power to magnetic power;

by the pod-side control unit of the power pod, controlling the pod-side power converter; and by the cell-side control unit of each power cell, controlling the cell-side power converter based on either: measuring a frequency and a phase of a magnetic field in the cell-side magnetic core, or: receiving, from the pod-side control unit, information regarding a frequency and a phase of a magnetic field in the pod-side magnetic core.

6. The method of operating an in-vehicle power supply system of claim 1, further comprising:

by the cell-side control unit of each power cell, reading and recording history and status information relating to operation of the power cell, wherein the history and status information includes one or more of: battery cell status, power cell identification or serial number, power cell model number, charge and discharge status power cell, power cell exchange and charging station or pump information, power cell charge or discharge lock or unlock status, and power cell permanent disable status; and communicating data and commands between the pod-side control unit of a power pod and the cell-side control unit of each power cell in contact with the power pod, by magnetic field coupling using a third frequency which is different from the first and second frequencies.

* * * * *